United States Patent
Goeddel et al.

[19]

[11] Patent Number: 6,141,345
[45] Date of Patent: *Oct. 31, 2000

[54] SIGNAL PROCESSING RESOURCE ALLOCATION FOR INTERNET-BASED TELEPHONY

[75] Inventors: Thomas William Goeddel, Fair Haven; Kevin K. Whang, Marlboro, both of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,254

[22] Filed: Mar. 6, 1997

[51] Int. Cl.[7] .......................... H04L 12/66; H04L 12/28; H04J 3/16

[52] U.S. Cl. .......................... 370/389; 370/352; 370/466

[58] Field of Search .................... 370/351, 352, 370/353, 354, 355, 356, 400, 401, 402, 408, 474, 466, 467, 389, 392, 410; 375/371, 373, 354; 379/93.01, 93, 159, 202, 93.08

[56] References Cited

U.S. PATENT DOCUMENTS

| | | | |
|---|---|---|---|
| 4,281,218 | 7/1981 | Chuang et al. | 179/1 |
| 5,519,769 | 5/1996 | Weinberger et al. | 79/112 |
| 5,526,353 | 6/1996 | Hently | 370/474 |
| 5,790,538 | 8/1998 | Sugar | 370/352 |
| 5,835,495 | 11/1998 | Ferriere | 370/465 |
| 5,838,665 | 11/1998 | Kahn et al. | 370/352 |
| 5,848,134 | 12/1998 | Sekiguchi et al. | 379/93.15 |
| 5,867,494 | 2/1999 | Krishnaswamy et al. | 370/389 |
| 5,940,479 | 8/1999 | Guys | 370/410 |
| 5,999,525 | 12/1999 | Krishnaswamy | 370/352 |

OTHER PUBLICATIONS

Nathan Muller, "Dial 1–800–Internet", Byte, Feb., 1996, vol. 21, No. 2, p. 83.

Douglas W. Johnson, "Internet–connected Phone Calls Dial in to Lower Prices", Computerword, Feb. 1996, p. 61.

"Internet Long Distance", GeoAccess Network, WorldWide Web, http://www.globalexpo.net/geoaccess/long.html.

"Perspective; The Internet Phone Is Poised To Conquer", Communications Week, Dec. 11, 1996.

"IDT Announces Major Breakthrough That Will Allow Worldwide PC–to–Telephone Calls Over The Internet", PR Newswire Association Inc., Oct. 23, 1995, Financial News.

Dow Jones article on Dialogic Corp. and VocalTec Ltd., Feb. 14, 1996.

*Primary Examiner*—Chi H. Pham
*Assistant Examiner*—Steven Nguyen
*Attorney, Agent, or Firm*—Joseph J. Opalach

[57] ABSTRACT

An access platform pools a plurality of different signal processing resources, herein represented by different types of speech-coding algorithms. The access platform is coupled to the Internet, a local-exchange-carrier (LEC), and other communications facilities such as, but not limited to, a plurality of long-distance facilities provided by any one of a number of long distance carriers, e.g., AT&T. For each call through the access platform, one of the plurality of signal processing resources is allocated as a function of signal type either through signal detection or out-of-band signaling. For example, the access platform first determines if the call is an audio call or a non-audio (or data) call by detecting the type of signal. If the call is an audio call, the access platform switches in echo canceling resources. On the other hand, if the call is a data call, the access platform determines if a speech-coding algorithm is being used and, if necessary, switches in a compatible speech-coding resource.

2 Claims, 5 Drawing Sheets

FIG. 6
FACILITIES TABLE

|  | INTERNET | LD CARRIER 1 | LD CARRIER 2 |
|---|---|---|---|
| COST * | $X | $Y | $Z |
| GRADE-OF-SERVICE | LOW | HIGH | HIGH |

* MAY BE MULTIPLE ENTRIES INDEXED TO TIME OF DAY, DAY OF WEEK, ETC.

FIG. 7
CALLED PARTY TABLE

| USER | CALLED PARTY NUMBER | QUALITY | ROUTING |
|---|---|---|---|
| USER 151-1 | (908) 767-3211 | LOW | LEAST COST |
|  | (204) 789-7612 | HIGH | FIRST AVAILABLE |
|  | (312) 722-7670 | N/A | LD CARRIER 1 |

FIG. 8
ROUTING TABLE

| USER | SPEECH CODING | QUALITY | ROUTING |
|---|---|---|---|
| USER 151-1 | "ELEMEDIA" | LOW | LEAST COST |

FIG. 9

| | | OPPOSITE ENDPOINT CONNECTION | |
|---|---|---|---|
| | | VOICE | DATA |
| LOCAL SUBSCRIBER CONNECTION | VOICE | — | COMPRESS/ DECODE |
| | DATA | COMPRESS/ DECODE | — |

SIGNAL PROCESSING RESOURCE ALLOCATION FOR INTERNET-BASED TELEPHONY

CROSS-REFERENCE TO RELATED APPLICATIONS

Related subject matter is disclosed in the co-pending, commonly assigned, U.S. Patent application of Chinni et al., entitled "An Access Platform For Internet-Based Telephony," Ser. No. application Ser. No. 08/0812,827, filed on Mar. 6, 1997.

BACKGROUND OF THE INVENTION

The present invention relates to communications equipment, and, more particularly, to Internet-based telephony.

The Internet today primarily carries data and image traffic. A small but potentially high-growth area is to have the Internet carry live voice conversations. This is a particularly attractive alternative for international callers, since the international long distance rate is still "very" high. In such an application, a calling party with a suitably-configured personal computer typically accesses an access platform (also known as an "Internet server" or "gateway"), which completes the call to the called party over the local public-switched-telephone-network.

In order to support live voice conversations, audio is typically encoded and formed into packets for transport using an Internet Protocol. Today, there are several vendors (e.g., VocalTec, DigiPhone, and Lucent Technologies' Elemedia) that each provide a different signal processing application to form these audio packets. Each signal processing application typically comprises a proprietary speech-coding algorithm and/or specific hardware. The end result is that one vendor's signal processing application for forming audio packets may not be compatible with another vendor's signal processing application. As such, a priori knowledge of which vendor's signal processing application is being used is required to support an Internet-based audio call. Typically, this requires that the above-mentioned access platform is pre-configured to support a particular type of speech-coding algorithm. For example, the access platform may only support one type of speech-coding algorithm—to the exclusion of others—or the access platform may assign communications resources to particular types of speech-coding algorithms.

SUMMARY OF THE INVENTION

We have realized that in order to support a Internet-based call, an access platform may be required to support a variety of different and incompatible types of signal processing applications or resources, from the above-mentioned speech-coding algorithms to echo cancelers, etc. Therefore, an apparatus and method is described herein for pooling signal processing resources and then allocating the resources as a function of signal type. As a result, it is possible to establish an end-to-end call over the Internet in the presence of multiple and even incompatible signal processing applications without requiring that the access platform be configured in a particular way.

In an embodiment of the invention, an access platform pools a plurality of different signal processing resources, herein represented by different types of speech-coding algorithms. The access platform is coupled to the Internet, a local-exchange-carrier (LEC), and other communications facilities such as, but not limited to, a plurality of long-distance facilities provided by any one of a number of long distance carriers, e.g., AT&T. For each call through the access platform, one of the plurality of signal processing resources is allocated as a function of signal type either through signal detection or out-of-band signaling. For example, the access platform first determines if an incoming call is an audio call or a non-audio (or data) call by detecting the type of signal. If the call is an audio call, the access platform switches in echo canceling resources. On the other hand, if the call is a data call, the access platform determines if a speech-coding algorithm is being used and, if necessary, switches in a compatible speech-coding resource.

BRIEF DESCRIPTION OF THE DRAWING

FIG. 6 is an illustrative facilities table for use in the alternate access platform of FIG. 2;

FIG. 7 is an illustrative called party table for use in the access platform of FIG. 2;

FIG. 8 is an illustrative routing table for use in the access platform of FIG. 2;

FIG. 9 is an illustrative table showing speech-coding options as a function of different connections.

DETAILED DESCRIPTION

Figure 1:
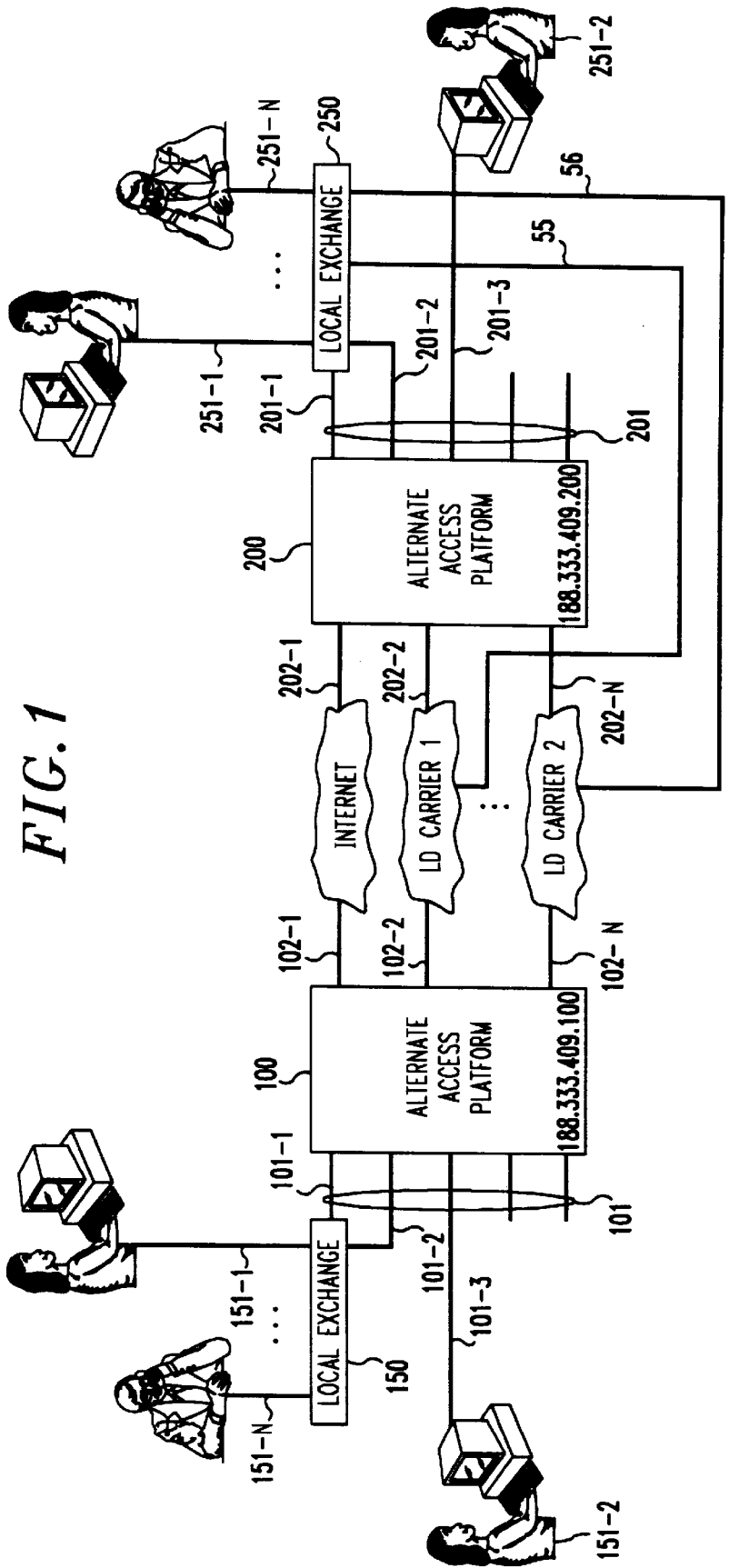
FIG. 1 is an illustrative block diagram of a communications system embodying the principles of the invention.

An illustrative high-level block diagram of a communications system embodying the principles of the invention is shown in FIG. 1. Other than the inventive concept, the elements of FIG. 1 are well-known and will not be described in detail. For example, the technology represented by access platform 100 is that of a "server" as known in the art, e.g., a Pentium®-based work station.

It is assumed that access platforms 100 and 200 both embody the principles of the invention. As such, the inventive concept will primarily be described in the context of a call setup originating with access platform 100. Communications in the opposite direction is similar and will not be described.

As shown in FIG. 1, access platform 100 is illustratively coupled to a number of different types of communications channels, facilities, or lines. For simplicity, only a small number of facilities are shown to simplify description of the inventive concept. Those skilled in the art will realize that other types and mixes of facilities can be used to practice the invention. In this context, facilities 101-1, 102-2, 102-n, 201-1, 202-2, and 202-n, are illustratively T1 lines; facilities 101-2 and 201-2 are illustratively analog lines; and facilities 101-3, 102-1, 201-1, and 201-3, are illustratively Internet lines. Since these various facility types are known in the art, they (and any concomitant interfaces) will not be described in detail. In addition, it is assumed that facilities 55 and 56 are T1 lines for conveying communications between each long distance (LD) carrier and local exchange 250.

Analog line 101-2 and T1 line 101-1 couple access platform 100 to a portion of the public-switched-telephone-network (PSTN) as represented by local exchange 150. The latter represents a central office that provides telephone service to a number of subscribers, or users, as represented by terminal equipment 151-1 to 151-n. Each of these users can have different types of terminal equipment. For example, terminal equipment 151-1 is a personal computer (PC) that is equipped to provide both voice and data, or multimedia, communications via an analog modem (i.e., includes suitable hardware and software to provide packet audio as known in the art) while terminal equipment 151-n has a plain-old-telephone-service (POTS) telephone. As used herein, a term of the form "user 151-1" refers to the user associated with that particular terminal equipment. A similar description is applicable to local exchange 250.

For illustration purposes, access platform 100 is coupled to each LD carrier via a T1 line such as T1 line 102-2 to LD Carrier 1. However, it should be realized that the actual connection to each LD Carrier can be done in a number of different ways. For example, T1 lines 102-2 to 102-n of access platform 100 could have alternatively been shown as coupled to a local exchange, which provides access to each of the different LD Carriers via a selection code (like 1-800-call-ATT). In this context, T1 lines 102-2 to 102-n are not dedicated to a particular long distance carrier and can be used to access any LD carrier.

For the purposes of this description, the following additional terminology is defined. As noted above, there are various communications facilities coupled to access platform 100, e.g., T1 lines, analog lines, and Internet lines. While some of these communications facilities could be characterized as circuit-switched or packet-switched, a distinction is made herein as to the "type of connection" established between two endpoints using these facilities. In particular, the "type of connection" refers to either a "voice connection" or a "data connection." In the former, a circuit-switched voice connection is established between two endpoints as known in the art. In the latter, an Internet Protocol (IP) connection is established as known in the art using a transmission control protocol (TCP) or a user datagram protocol (UDP). (It should be noted that an IP connection can be routed over circuit-switched facilities.)

Figure 2:
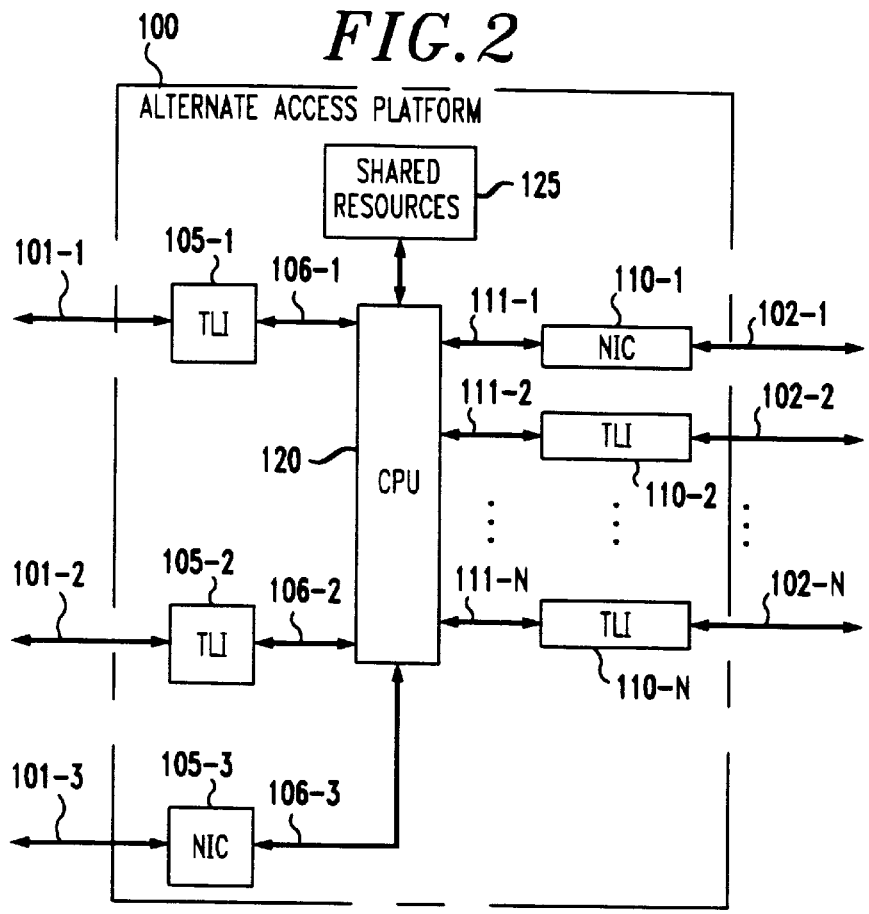
FIG. 2 is an illustrative block diagram of an access platform in accordance with the principles of the invention.

An illustrative block diagram of access platform 100 is shown in FIG. 2. As noted earlier, access platform 100 is a server, which is configured to provide alternate forms of access to different types of services. Access platform 100 includes corresponding interface hardware and software (herein referred to as a controller) for coupling to the various above-mentioned facilities. In this example, controllers 105-1, 105-2, and 110-2 to 110-n are "Trunk/Line Interface" (TLI) controllers for supporting T1 and analog lines, and controllers 105-3 and 110-1 are "Network Interface" controllers (NIC) for supporting Internet lines. Illustrative representations of these interfaces exist today and are available on circuit boards or cards. For example, TLI controllers are available from Natural Micro System, and NICs are available from 3Com.

For simplicity, each controller is shown as being directly coupled to processing circuitry, e.g., central processing unit (CPU) 120, via a particular "bus," such as bus 106-1 for TLI controller 105-1. However, it should be realized that in actual practice some controllers may be coupled to CPU 120 via the same bus. For example, server 100 may include both ISA and PCI buses as known in the art. As such, some of the controllers may transfer information via the ISA bus while other controllers plug into both the ISA and the PCI bus. In addition, the controllers may also vary in their ability to adhere to other PC-type transfer mechanisms such as SCSA (Signal Computing System Architecture), MVIP (Multivendor Integration Protocol), etc. CPU 120 represents the remainder of server 100 and includes a processor (such as a Pentium®), volatile and nonvolatile memory that includes both read-only memory (ROM), random-access memory (RAM) and storage devices such as a hard disk, keyboard and display. In accordance with the inventive concept, CPU 120 is coupled to shared resources 125 via time-slot-interchange (TSI) bus 121.

Figure 3:
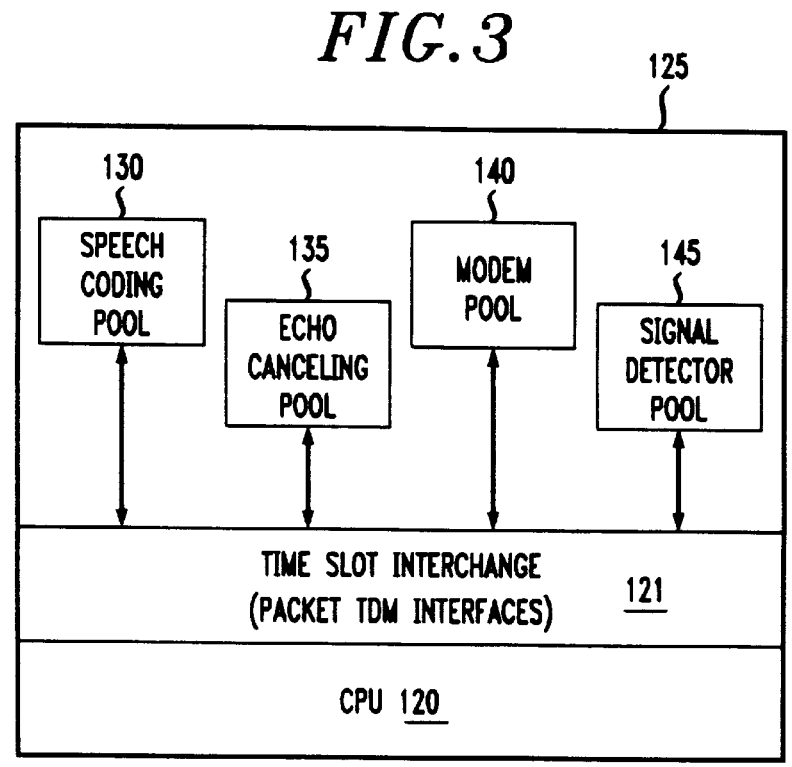
FIG. 3 is an illustrative block diagram of the signal processing resources portion of the access platform of FIG. 2.
Figure 4:
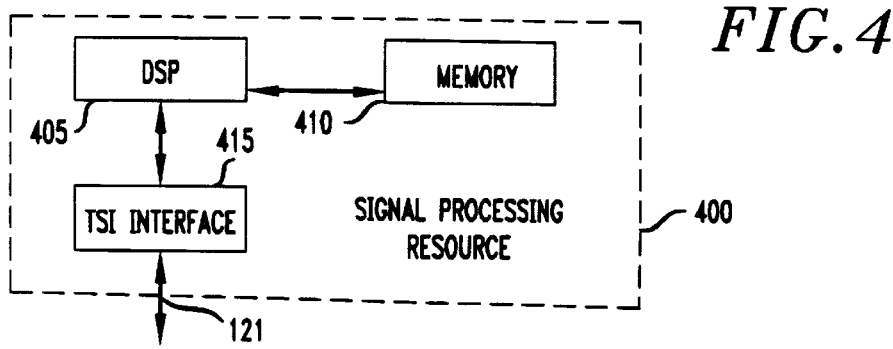
FIG. 4 is an illustrative block diagram of a signal processing resource.

Referring now to FIG. 3, there is shown a more detailed block diagram of an embodiment of the inventive concept. Shared resources 125 comprises a plurality of "pools," each pool comprising like signal processing resources or applications. For example, speech-coding pool 130 comprises a plurality of different speech-coders; echo-canceling pool 135 comprises a number of echo cancelers; modem pool 140 comprises a plurality of modems; and signal detector pool 145 comprises a digital-signal-processor (DSP) programmed for detecting signal type. For the purposes of this description, it is assumed that each signal processing resource or application is generically represented by signal processing resource 400 shown in FIG. 4. The latter comprises DSP 405, memory 410, and TSI interface 415. For example, in the context of a particular speech-coding resource, memory 410 stores the speech-coding algorithm and TSI handshaking software, which is executed by DSP 405. Data is exchanged with CPU 120 via TSI 121 through TSI interface 415. (It should be noted that the exemplary architecture shown in FIG. 4 could also be embodied in an application-specific-integrated-circuit (ASIC) as known in the art.) As used herein, each signal processing application or resource is referred to by the number NNN-x, where NNN represents the pool number and x represents an individual resource or application, where x takes on the value 1 to the number of resources or applications in that particular pool. For example, for five speech-coding applications in speech-coding pool 130, each application is respectively associated with the numbers 130-1 through 130-5.

TSI interface 415 implements a time-division-multiplexed (TDM) interface as known in the art. As such, TSI bus 121 provides CPU 120 the ability to dynamically establish connections to each signal processing application or resource for processing a signal. For example, the TSI bus is partitioned into a repeating frame, each frame comprising a number of time-slots. A portion of the time-slots are dedicated to control and status information. The remaining portion of the time-slots are available for assignment for carrying data. CPU 120 assigns data time-slots by sending control messages, via the above-mentioned control and status information time-slots, to pre-assigned addresses, each address associated with one of the signal processing resources. For example, speech-coder 130-1 is assigned by CPU 120 to time-slots 10 and 11 for upstream and downstream data to, and from, CPU 120. Assuming that downstream data is in an encoded form, speech-coder 130-1 un-encodes this data and provides the unencoded data on the upstream channel to CPU 120.

Figure 5:
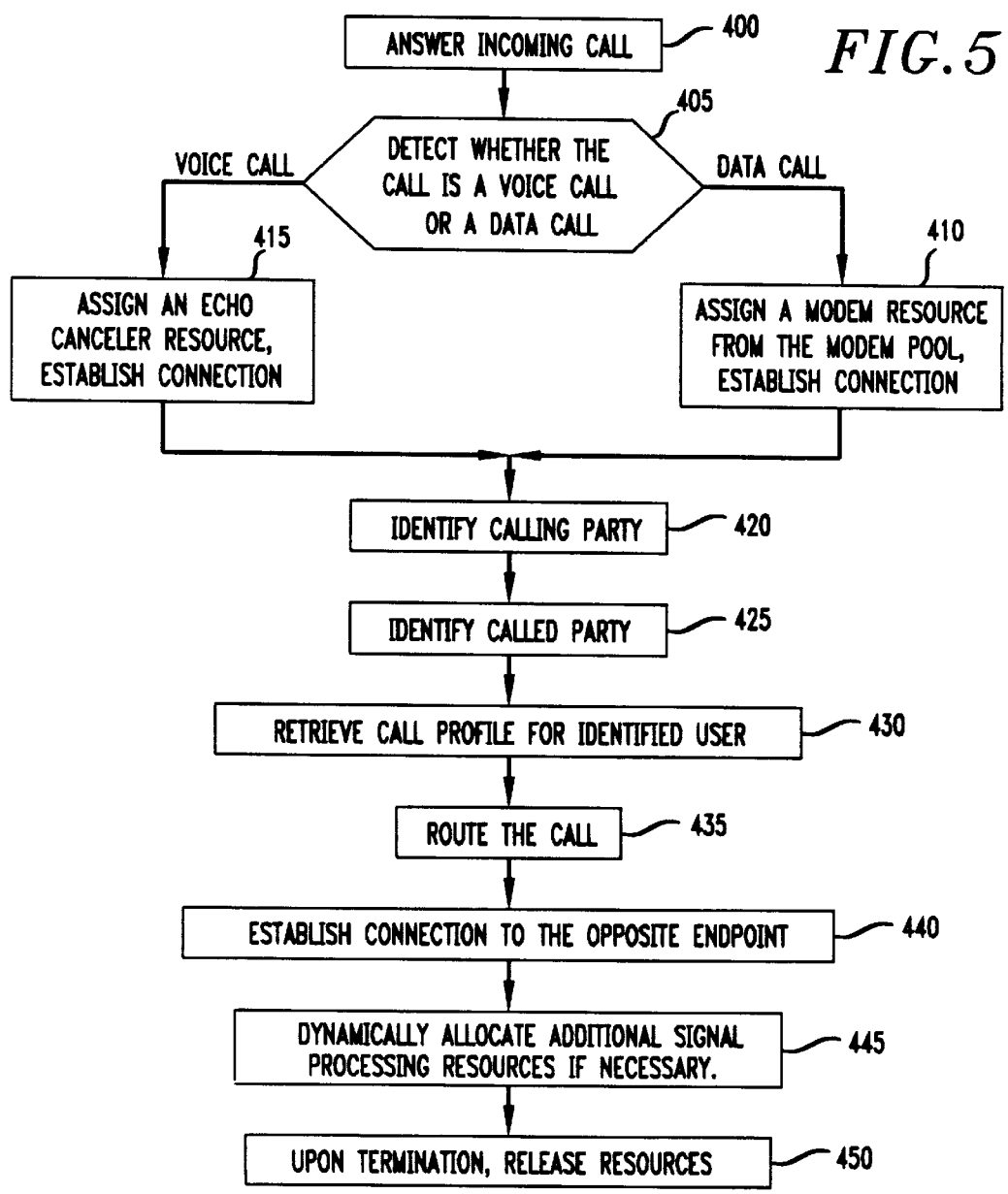
FIG. 5 is an illustrative flow diagram of a method embodying the principles of the invention for use in access platform 100 of FIG. 2.

At this point, in order to facilitate understanding the inventive concept, reference should be made to FIG. 5, which represents an illustrative method for use within access platform 100 to process a call. In this example, it is assumed that the call is a POTS call, and it is assumed that user 151-1 is the calling party and user 251-n is the called party. Although the following example is illustrated in the context of a "data call," references to "voice call" operation are also provided. User 151-1 launches a data call by performing keyboard dialing via their PC and dials a predefined telephone number associated with analog line 101-2 of access platform 100. (Obviously, from FIG. 1, it is assumed that user 151-1 is running, e.g., a browser application with associated dialing software and modem to subsequently establish a TCP/IP connection with access platform 100). In step 400, access platform 100 establishes a connection to user 151-1 as known in the art, e.g., by answering the incoming call. Once the call has arrived at the access platform, and in accordance with the principles of the invention, access platform 100 detects whether the incoming call is a voice call or a data call in step 405. In particular, CPU 120 allocates the incoming call to DSP detector 145-1, via TSI 121. DSP detector 145-1 analyzes the signal to determine if the call is a voice call or a data call. Such "call classifiers" are known in the art, e.g., see U.S. Pat. No. 4,281,218 issued Jul. 28, 1991 to Chuang et al. and entitled "Speech-Nonspeech Detector-Classifier."

If the call is a data call, access platform 100 assigns a modem resource from the modem pool in step 410. The end result is the establishment of a TCP/IP connection, which is referred to herein as a data connection. (On the other hand, if the call is a voice call, access platform 100 assigns an echo canceler resource in step 415, to establish a voice connection with the calling party.)

In step 420, access platform 100 recovers user identification. If the connection is a data connection, the IP address of user 151-1 is recovered from the negotiated IP connection. (Conversely, if the connection is a voice connection, CPU 120 of access platform 100 provides a signal, e.g., a tone, (via TLI controller 105-2) to user 151-1 to indicate that access platform 100 has answered the call. User 151-1 then enters a password (using a sequence of predetermined touch-tones) for identification. (It should also be noted, that the well-known Automatic Number Identification (ANI) information could also be used).)

In step 425, called party information is recovered by access platform 100. Since, in this example, a data connection between access platform 100 and user 151-1 is established, an "html-compatible" form (not shown) is displayed by access platform 100 with a corresponding entry field highlighted for the called party telephone number. (Alternatively, user 151-1 can simply desire to "surf the net" via access platform 100 and ignore entering a called party telephone number.)

For a voice connection, CPU 120 of access platform 100 provides another signal, e.g., a tone, (via TLI controller 105-2) to user 151-1 to indicate that access platform 100 is ready to receive the called number. (Alternatively, a more sophisticated interactive-voice-response (IVR) system as known in the art can be used. This would also allow additional feedback to be provided to a user such as "please enter the telephone number.") User 151-1 enters the called party telephone number via, e.g., the touch-tone keypad of terminal equipment 151-n, which is received by access platform 100, via TLI controller 105-2. For a POTS to PC call, if the called party's IP address is 108.456.332.324, the calling party enters equivalent touch-tones corresponding to 108#456#332#324, where the "#" symbol is used to represent the "." of the IP address format. From the point of view of the access platform, discrimination between whether a PSTN-style telephone number is being entered or an IP address is being entered can be indicated by use of a predefined touch-tone, e.g., "*" in front of an IP address.

Access platform 100 is configured to provide subscribers alternate forms of access to different types of services via a "call profile" and also provides a set of "enhanced services" (described below). As such, access platform 100 stores a data base of information, which is illustratively shown as a facilities table in FIG. 6. This table provides a cross-index for quality and cost for each communications facility associated with a particular provider. This table is stored on the above-mentioned hard disk (not shown) of alternate access platform 100.

As shown in FIG. 6, the entries for cost are simplified for illustration purposes to X, Y, and Z, dollars, where it is assumed that X<Y<Z. It should also be noted that any cost figures can be further indexed to account for the day of the week, time of the day, etc. (For example, LD carrier 1 may be cheaper during the week compared to prices offered by LD carrier 2, but on the weekends the reverse may be true.) As used herein, the term "quality" refers to the general quality of transmission. For example, for voice transmission, the quality of the Internet may be characterized as "low" because of the risk of delay, lost packets, and, generally speaking, low audio quality. In contrast, the quality provided by LD carrier 1, and LD carrier 2, is expected to be higher than the Internet. For purposes of this example, it is assumed that these latter communication networks provide the same quality, e.g., "high" as shown in FIG. 6.

In step 430, access platform 100 retrieves a "call profile" associated with the identified user, here user 151-1. A "call profile" offers a hierarchy of access for different call types for each user. A user's "call profile" is stored as a data base and indexed as a function of either the user's telephone number or IP address. An illustrative call profile 500 for user 151-1 comprises two tables, which are illustrated by FIGS. 7 and 8, respectively.

An illustration of the first table, the called party table, is shown in FIG. 7 for user 151-1. Settings in this table allow user 151-1 to individually determine route selection as a function of the called party. The called party table comprises a number of fields: the called party telephone number, the quality field, and the routing field. The called party telephone number field is self-explanatory. The quality field in this example is the quality desired for a call to that called party. Illustratively, it is assumed that the quality field consists of: "high," "low," and "N/A" (not applicable). Finally, the routing field determines the routing method. In this example, it is assumed that alternative routing methods are: "least cost," "first available," and "facility provider." The "least cost" entry instructs access platform 100 to select, for a given quality, that long distance facility that is the cheapest when making the call (as determined from the facilities table of FIG. 6). The "first available" entry instructs access platform 100 to select, for a given quality, the first available long distance facility, which, e.g., is selected on a round-robin basis. Finally, a "facility provider," as represented by the entry "LD Carrier 1," is used by access platform 100 to use the identified facility provider. It should be noted that for a quality entry of "N/A," the quality field is ignored in selection of the communications facility. For example, for an entry of "N/A," access platform 100 selects the communications facility as a function of the entry in the routing field.

However, if the called party's telephone number is not entered into the called party table, then access platform 100 routes the call in accordance with a routing table that identifies general routing preferences for each user, or subscriber. An illustrative routing table entry for user 151-1 is shown in FIG. 8. The routing table entry for user 151-1 comprises a number of fields: the quality field, and the routing field. The quality field and the routing fields, in this example, are similar to the respective fields in the above-described called party table. Access platform 100 routes the call in accordance with these entries. For example, a "least cost" entry in the routing field instructs access platform 100 to select, within a given quality, that facility that is the cheapest when making the call.

Returning to FIG. 5, access platform 100 routes the call in step 435 by selecting the appropriate communications facility in accordance with either the called party table or the routing table as appropriate. In step 440, access platform 100 establishes a connection to an opposite endpoint. This connection is a function of the type of communications facility selected. If access platform 100 selects an LD carrier for routing the call, access platform 100 establishes a voice connection with the called party and simply dials the called party telephone number. The LD carrier completes the telephone call through the PSTN as represented by facilities 55 and 56, of FIG. 1. In contrast, if access platform 100 selects an Internet line for routing the call, then access platform 100 establishes a data connection with another access platform, herein represented by access platform 200. In order to establish this data connection, access platform 100 "maps" the called party telephone number into an IP address. As such, access platform 100 additionally stores a "mapping table" (not shown) that associates the area code portion of a called party telephone number with a respective IP address of another access platform. In this example, the area code of the called party is used by access platform 100 to index into this "mapping table" to retrieve an associated IP address that corresponds to access platform 200, i.e., IP address 188.333.409.200.

Subsequent to establishing a data connection to access platform 200, additional steps such as "call signaling," and, perhaps, "encoding/un-encoding" of respective audio signals are also performed by access platform 200.

With regards to "call signaling," a packet signaling format is used to communicate call signaling information for "call setup," "call tear-down," etc., between access platforms. In particular, the well-known H.323 protocol is used to support the exchange of signaling information between access platform 100 and access platform 200. For example, using the H.323 protocol, signaling messages are illustratively transmitted in the command fields by using predefined formats. In its basic form a signaling message comprises a message-type sub-field, and a data sub-field. In this context, a call setup message comprises a predefined number in the message type sub-field indicating that this is a call setup signaling message. As such, the data sub-field carries the called party telephone number. Continuing with the example, upon receiving a call setup message, over Internet line 201-1, access platform 200 places a telephone call to the indicated called party using the received called party telephone number.

As known in the art, speech-coding is typically used in a data connection. (If should be noted that in some instances, e.g., system configurations, available bandwidth, etc., it may not be necessary to encode the audio. However, for the purposes of this example, it is assumed that audio, if present, is encoded on any data connection. Should such compression be optional, then the access platform is suitably modified.) As such, access platform 100 enables speech-coding of audio as shown in FIG. 9 as a function of the types of connections between each pair of endpoints. For example, if a voice connection exists to the local subscriber, e.g., user 151-n, and a voice connection exists to the opposite endpoint, which is associated with user 251-n, as described above, then no speech-coding is required. However, in this instance, if a data connection is, instead, established to access platform 200, then speech-coding is enabled as between access platform 100 and access platform 200. (The use of speech-coding is governed in a similar manner in the so-called receiving access platform 200.) From FIG. 9, it can be observed that if a data connection exists on both pairs of connections, then access platform 100 simply passes through the encoded audio (except as described below). For example, if user 151-2 establishes a data connection to access platform 100, and the latter establishes a data connection to access platform 200, no speech-coding is performed in access platform 100.

However, and in accordance with the principles of the invention, access platform 100 dynamically allocates particular speech-coding resources to ensure end-to-end compatibility. For example, in the case where user 151-1 establishes a data connection to access platform 100 and subsequently establishes a voice connection to a called party, access platform 100 allocates a speech-coding resource as a function of calling party's identity. In this case, the above-mentioned calling party profile is modified to include the speech-coding algorithm used by user 151-1, which is that speech-coder provided by "Elemedia" as shown in FIG. 8. As a result, access platform 100 selects the appropriate speech-coding resource and provides an un-encoded audio signal for transmission to the called party, and encodes the received audio signal from the called party for transmission via the data connection to user 151-1.

Similarly, in the case where user 151-n establishes a voice connection to access platform 100 and subsequently establishes a data connection to a called party, access platform 100 allocates a speech-coding resource as a function of calling party's identity. In this case, the above-mentioned calling party profile is modified to include the speech-coding algorithm used by user 151-n. As a result, access platform 100 selects the appropriate speech-coding resource and provides an encoded audio signal for transmission to the called party, and un-encodes the received audio signal from the called party for transmission via the voice connection to user 151-n.

It should also be realized that access platform 100 receives incoming calls from access platform 200. In this instance, when a data connection is established, access platform 100 detects the particular type of speech-coding algorithm in use and assigns a compatible one of the speech-coding resources. The type of speech-coding algorithm is identified by analyzing the received IP packets. In this instance, a portion of the packet itself is used to identify call information.

Figure 10:
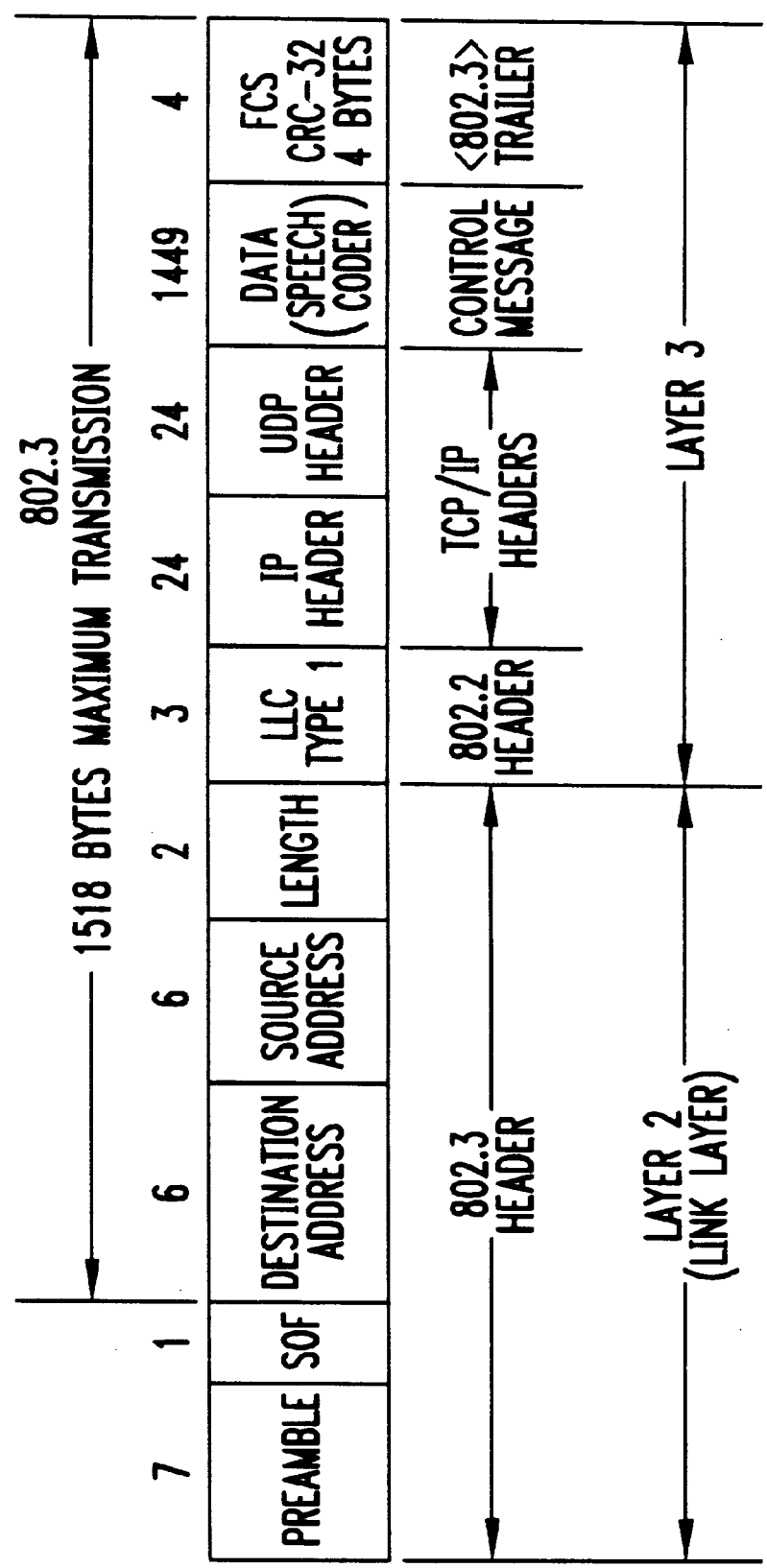
FIG. 10 is an illustrative TCP/IP Frame for conveying speech-coder information.

In particular, in establishing a TCP/IP connection, negotiation takes place. (As used herein TCP/IP connections conform to IEEE 802.3.) The type of speech-coder is sent as a control message in the data field. An illustrative TCP/IP frame is shown in FIG. 10. The speech-coder information is illustratively 2 Bytes long and is transmitted within the data field, which has a capacity of 1449 bytes (in this instance 1447 of those bytes are not used). The number transmitted in this field is associated with a particular type of speech-coder. This association is known a priori to both access platforms. For example, an "Elemedia" speech coder is associated with 0x0808, while a "VocalTec" speech coder is associated with 0xAABB (these numbers are in hex format, two bytes long).

Finally, upon termination, all the access and signal processing resources are released and returned to the pool in step 450.

In the earlier example, user 151-1 established a data connection to access platform 100, which then routed the call as a function of the call profile information and the called number. In a similar fashion, as noted above, calls are completed between users 151-n and 151-2 and users 251-1, 251-2, or 251-n. It should be noted that in the case of the called party being user 251-1 and 251-2, a data connection is established between access platform 200 and either user 251-1 or 251-2.

The above-mentioned calling party profile can be established in any one of a number of ways. For example, upon opening an account with the access provider, a user can simply provide such information on paper to a system administrator, who enters the information into the above-mentioned tables. Conversely, a voice-response system is implemented on access platform 100. This voice-response system, as known in the art, allows a calling party to enter and retrieve information. In fact, in place of, or in addition to, the above-mentioned calling party profile, a voice-response system is used on each call to solicit the routing information from the calling party.

Other variations are also possible, e.g., instead of the above-described "two-stage" dialing procedure for a voice connection (i.e., first the calling party dials the access provider, then the calling party dials the called party), a simple speed dialing feature is implemented in access platform 100. For example, after dialing the telephone number associated with access platform 100, a user could then enter a code, e.g., a two digit number such as "#2" which is indexed into a speed dialing table associated with the particular calling party. From this speed dialing table, the called party telephone number can be retrieved. In this context, the calling party's ANI is used to for authentication by access platform 100.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was described in the context of local telephone access, via local facilities 101-1 and 101-2, other methods of local access are possible, such as, but not limited to, the use of cable facilities for coupling to cable networks, local area network (LAN) facilities for coupling to LANs, Wide Area Network (WAN) facilities for coupling to WANS, direct coupling to a private branch exchange (PBX) and, simply, an Internet connection. In each of these cases, suitable controllers would be included within the access platform. Similarly, other types of communications networks can be used to transport information from one access platform to another. For example, a satellite communications system is used as yet another alternative to either use of the Internet, LD carrier 1, or LD carrier 2. It should be noted that other types of long distance communications networks may require additional mapping entries (similar to the Internet mapping mentioned above) to correctly route the telephone call. Similarly, additional types of local access facilities may require modification to items such as the calling party profile, which as described above was indexed to the calling party telephone number. For example, if local access is also possible from a LAN, a source address is translated to an equivalent calling party telephone number, or separate calling party profiles are used for calls coming in from the Internet versus the PSTN, etc.,

What is claimed:

1. A method for processing signals in communications equipment, the method comprising the steps of:

receiving at-least-two incoming signals, the at-least-two incoming signals representing packets of speech-coded data that are incompatible with each other;

grouping signal processing resources into a number of pools, wherein one of the pools is a speech-coding pool;

determining a signal type of each received incoming signal;

wherein when the determined signal type is data for the at-least-two received incoming signals, further including the steps of:

processing the at-least-two received incoming signals to identify the type of speech-coded data in each of the at-least-two received incoming signals, the speech-coded data being representative of a particular speech-coding algorithm; and selecting at least two speech-coding resources from the speech-coding pool such that one of the selected speech coding resources is compatible with the identified type of speech coding signal in one of the at-least-two received incoming signals and the other of the selected speech coding resources is compatible with the identified type of the other of the at-least-two received incoming signals; and processing the received at-least-two incoming signals with the selected speech-coding resources for enabling communications between parties; notwithstanding that incompatible speech-coding algorithms are represented by the packets of speech-coded data in the at-least-two received incoming signals.

2. Communications apparatus used for interconnecting parties for communications, the apparatus comprising:

a plurality of signal processing resources;

interface circuitry for coupling to communications lines for receiving at least-two signals therefrom;

at least one signal detector for identifying a signal type of the received signals; and processing circuitry responsive to the signal detector for selecting individual ones of the signal processing resources to process the received signals for enabling communication between the parties, wherein at least some of these resources represent different speech-coding applications and wherein the at least one signal detector further identifies that incompatible speech-coded data is present in packet form in each of the at-least-two received signals such that the processing circuitry selects a compatible speech-coding application for each of the at-least-two received signals and wherein the selected speech-coding applications are incompatible with one another.

* * * * *